United States Patent [19]
Brenes

[11] Patent Number: 5,975,492
[45] Date of Patent: Nov. 2, 1999

[54] BELLOWS DRIVER SLOT VALVE

[76] Inventor: Arthur Brenes, 5855 Jensen Rd., Castro Valley, Calif. 94546

[21] Appl. No.: 08/892,505

[22] Filed: Jul. 14, 1997

[51] Int. Cl.⁶ .................................................. F16K 25/00
[52] U.S. Cl. ............................ 251/175; 251/193; 251/187
[58] Field of Search .............................. 251/62, 175, 193, 251/187, 195

[56] References Cited

U.S. PATENT DOCUMENTS

| | | | |
|---|---|---|---|
| 4,131,131 | 12/1978 | Frisch | 251/175 |
| 4,164,211 | 8/1979 | Onnen | 251/175 |
| 4,412,671 | 11/1983 | Tiefenthaler | 251/175 |
| 5,163,478 | 11/1992 | De Fries | 251/175 |
| 5,169,125 | 12/1992 | Bailey | 251/175 |

OTHER PUBLICATIONS

Brochure for '22000 Series, Stainless Steel Rectangular Valves,' High Vacuum Apparatus Manufacturing, Inc.: Hayward, pp. 1–6, No Date.

*Primary Examiner*—David J. Walczak
*Attorney, Agent, or Firm*—Flehr Hohbach Test Albritton & Herbert LLP

[57] ABSTRACT

A slot valve assembly (10) including a housing (11) having a central opening (19), a valve plate (32), a strongback (20) for carrying the valve plate, a pair of actuators (34, 36) for raising and lowering the strongback to position the valve plate over opening (19), and a second set of actuators (240) for moving valve plate (32) into seating engagement with housing (11). Second actuators (240) are in fluid communication with the working chambers (48, 50) of the first pair of actuators (34, 36). First actuators (34, 36) are located within housing (11) to give the housing a much shorter height.

18 Claims, 14 Drawing Sheets

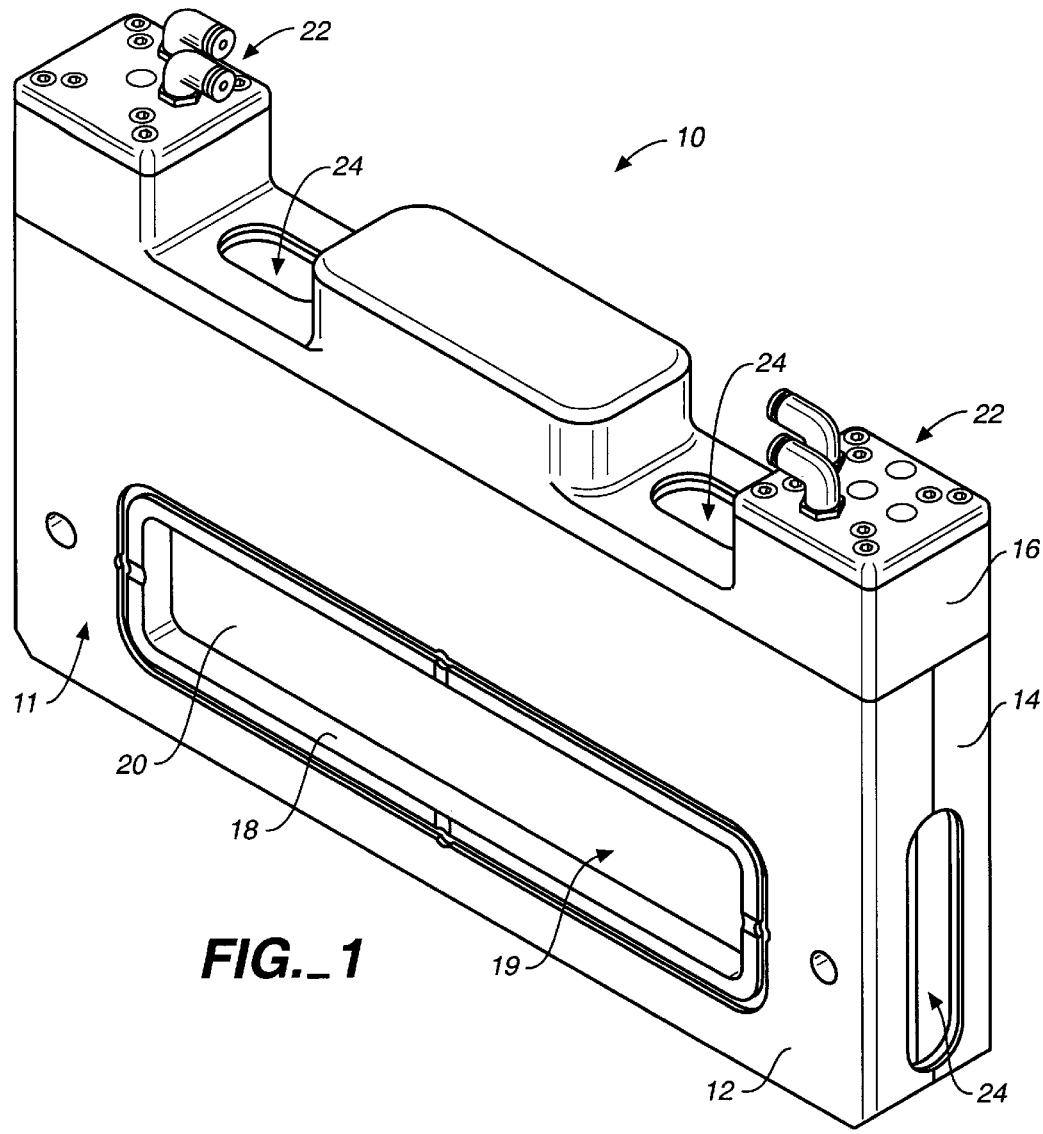
FIG._1
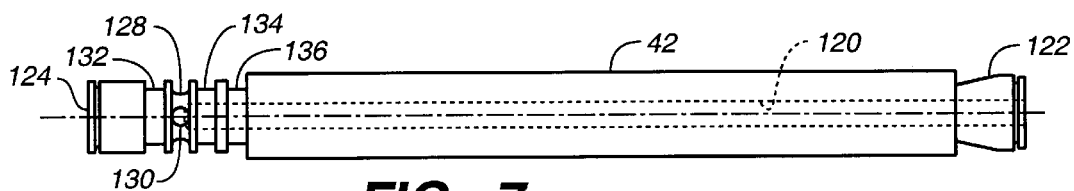
FIG._7
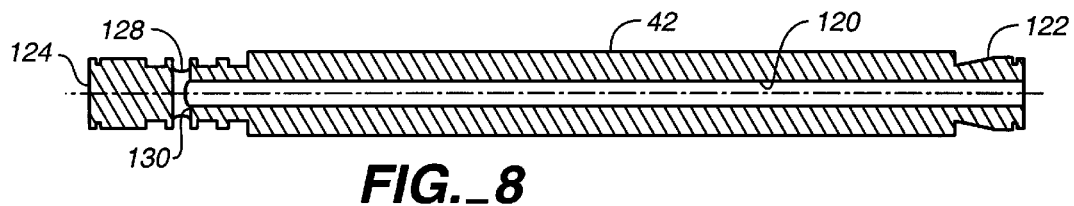
FIG._8

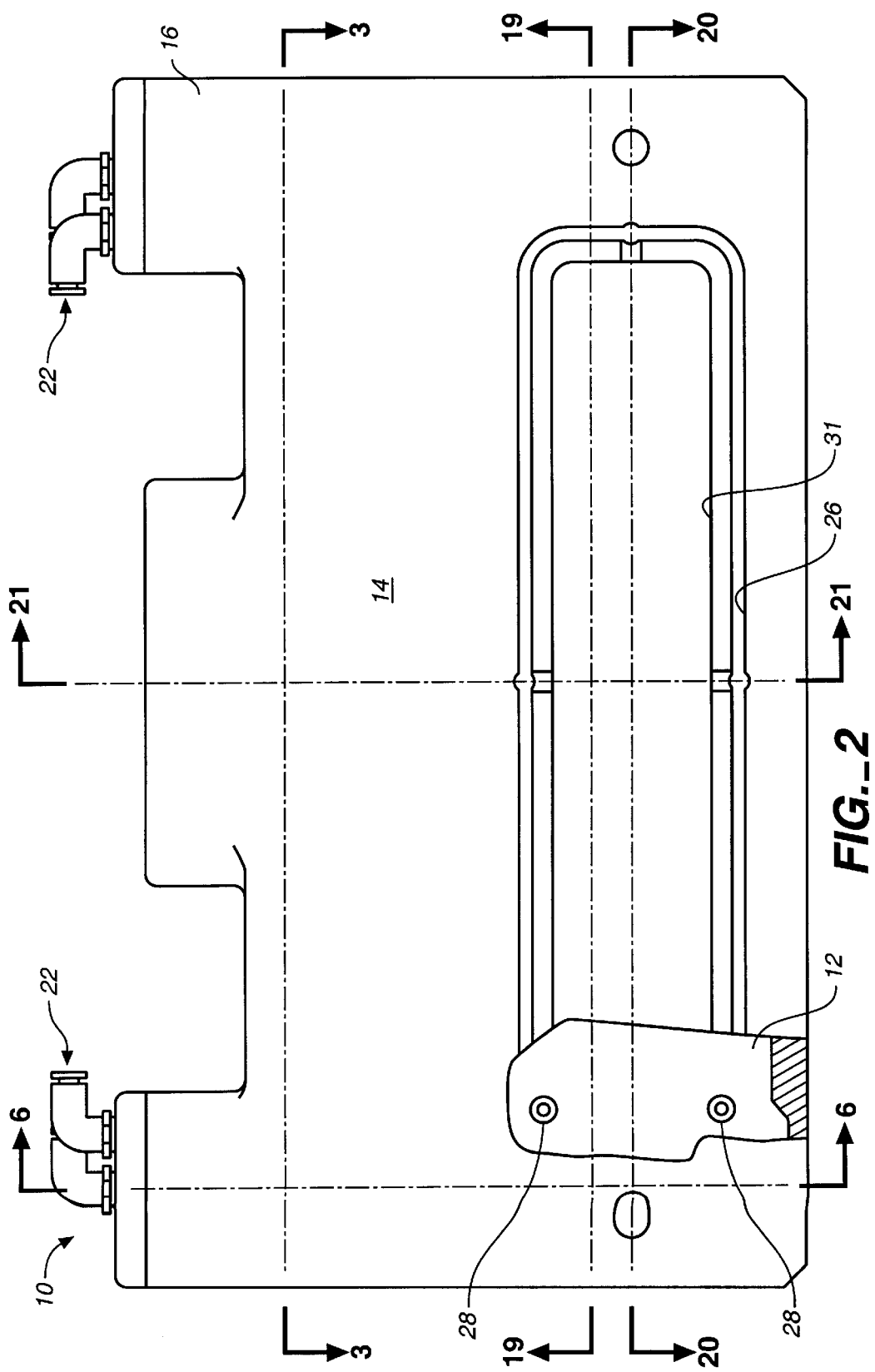

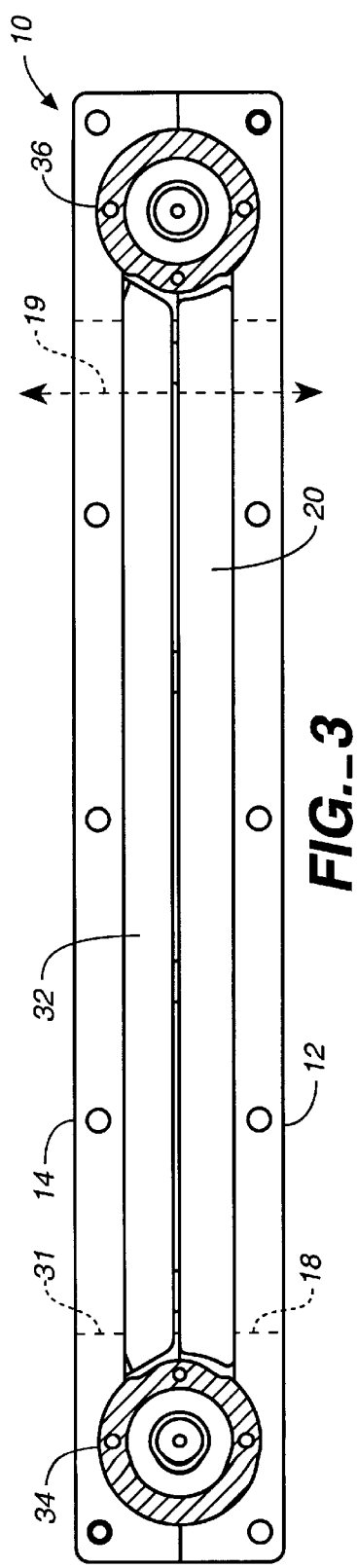
FIG._3
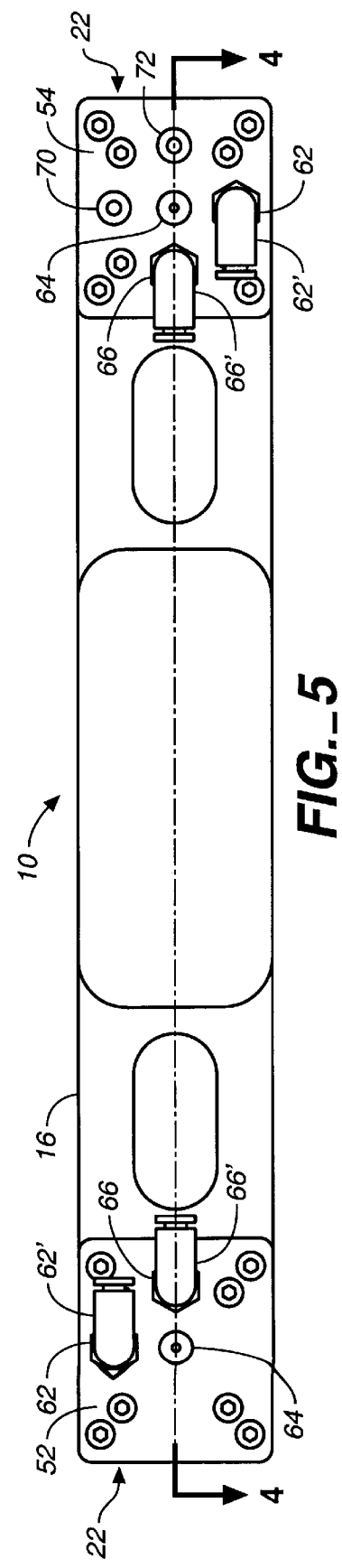
FIG._5

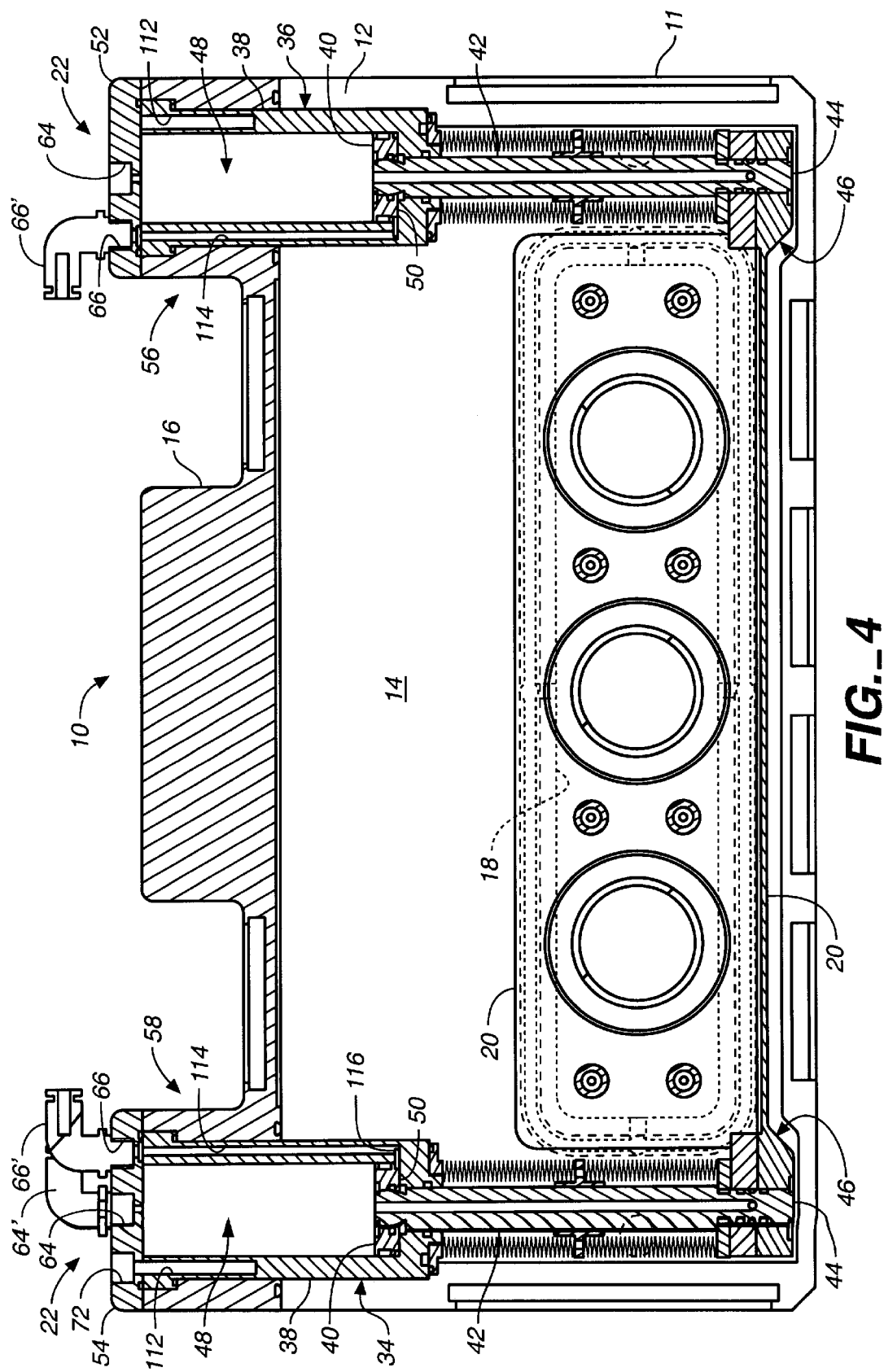
FIG._4

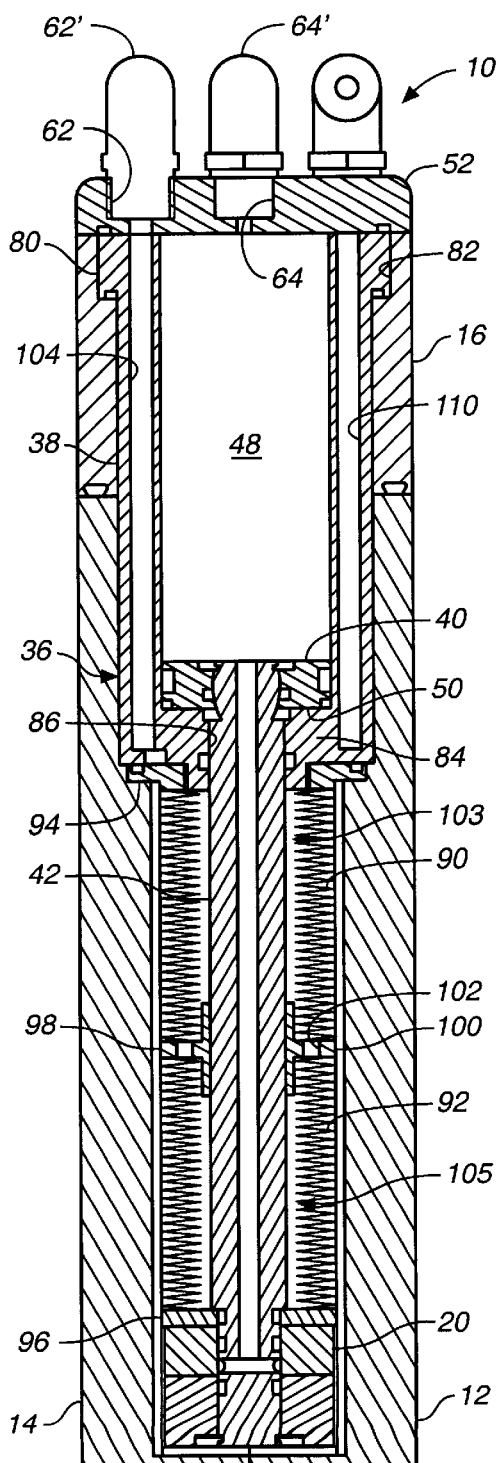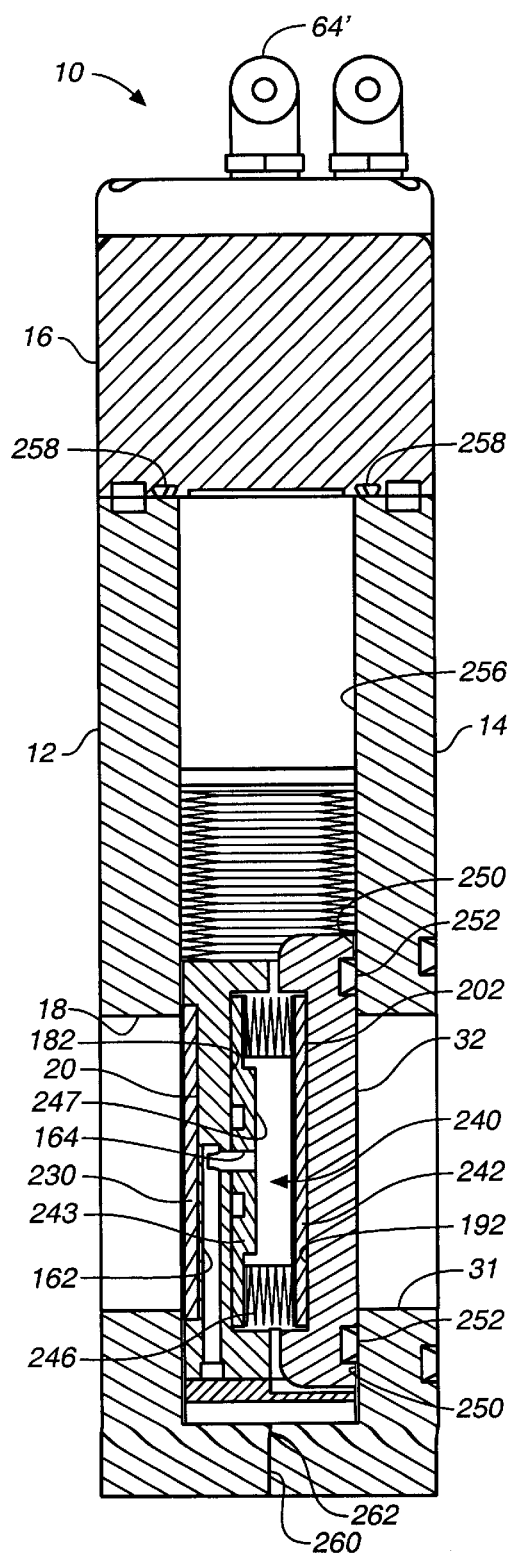
*FIG._6*  *FIG._21*

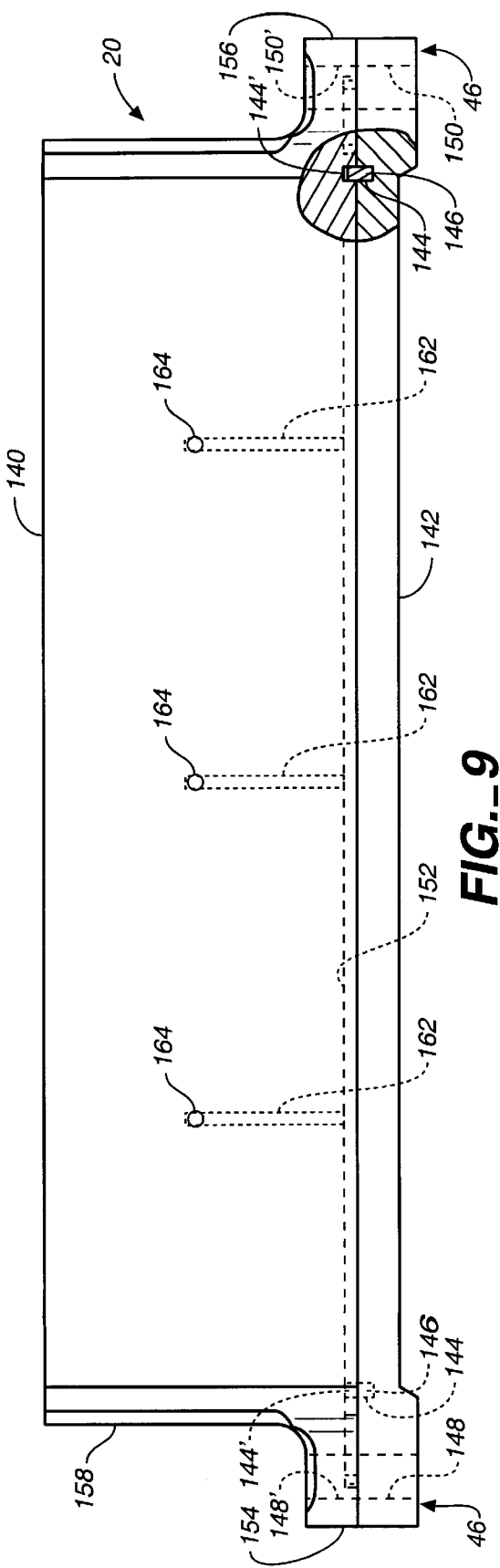
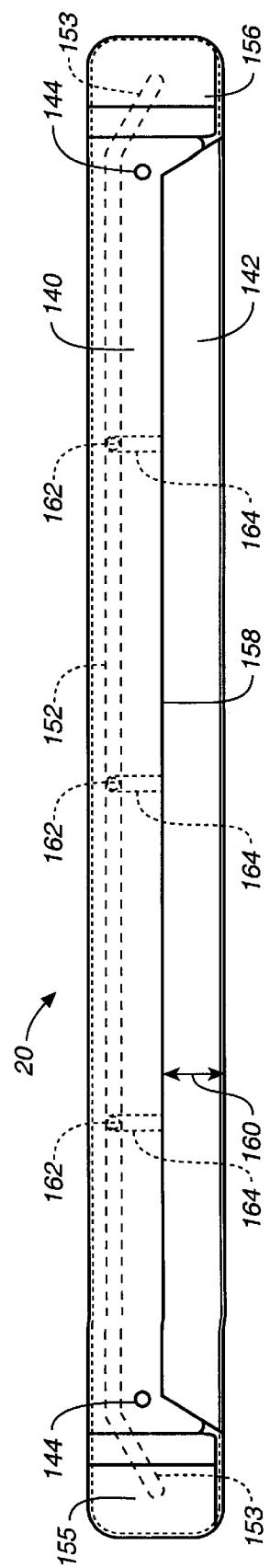

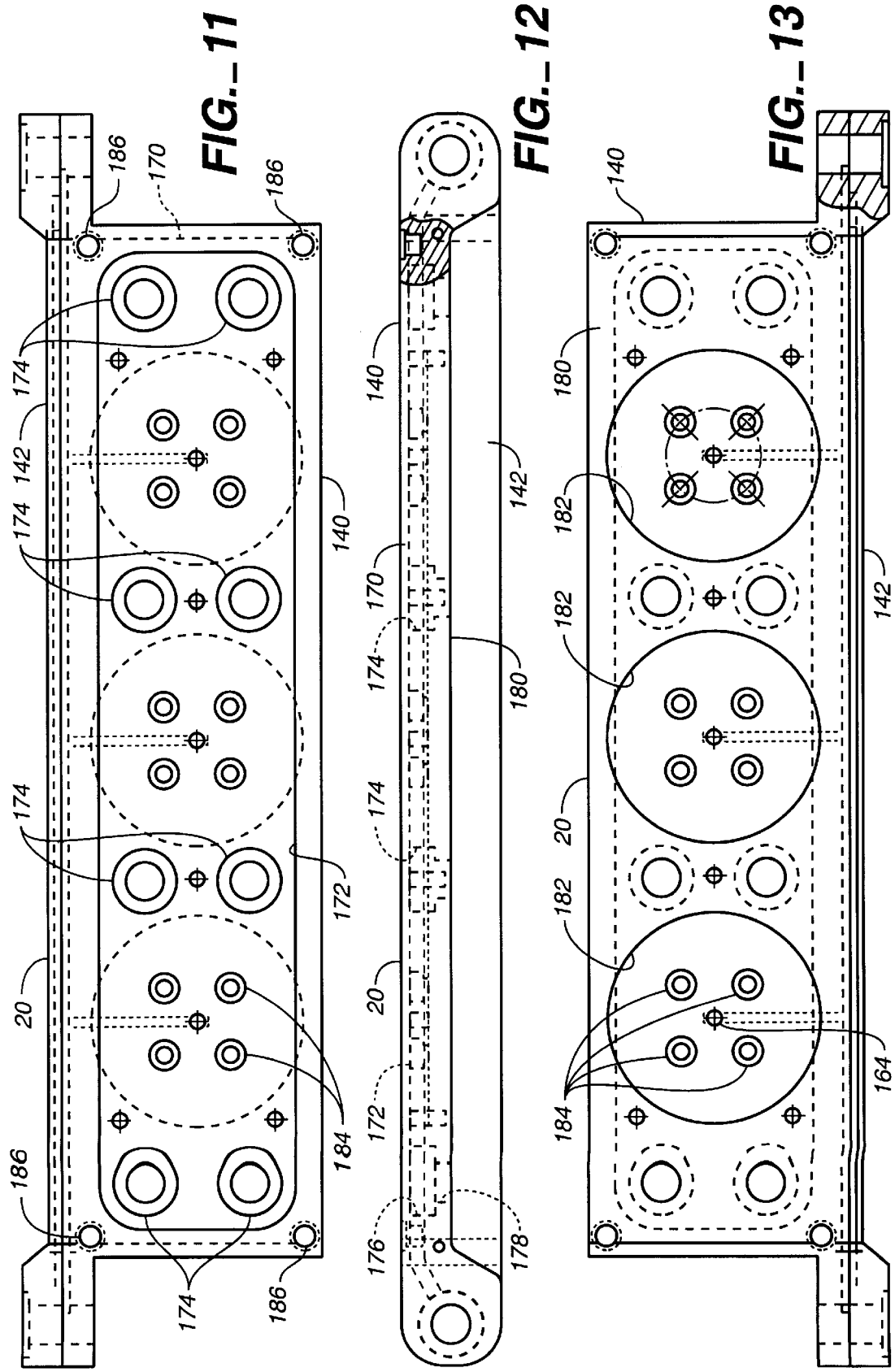

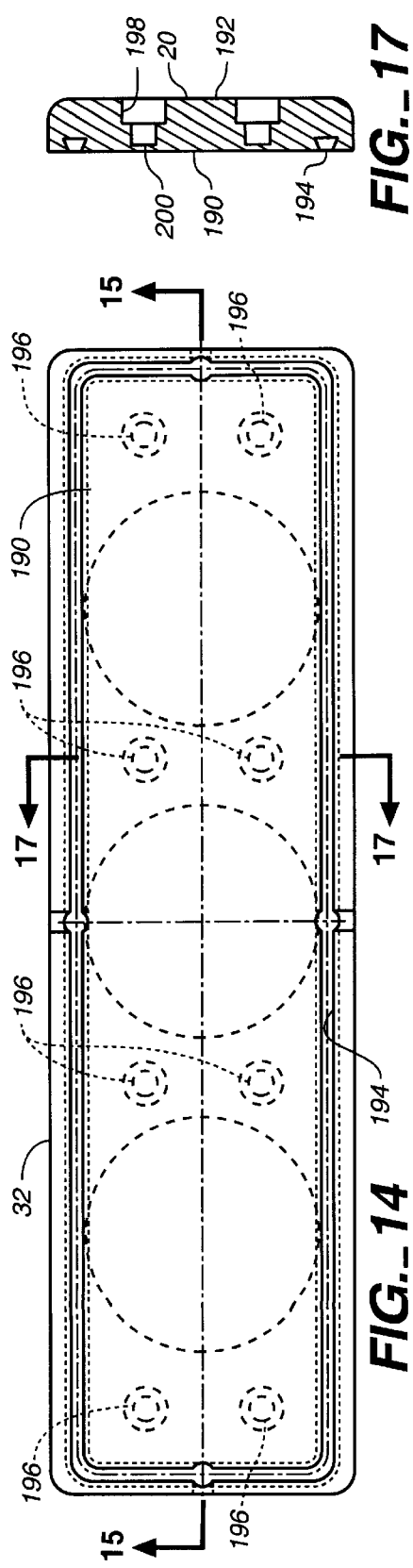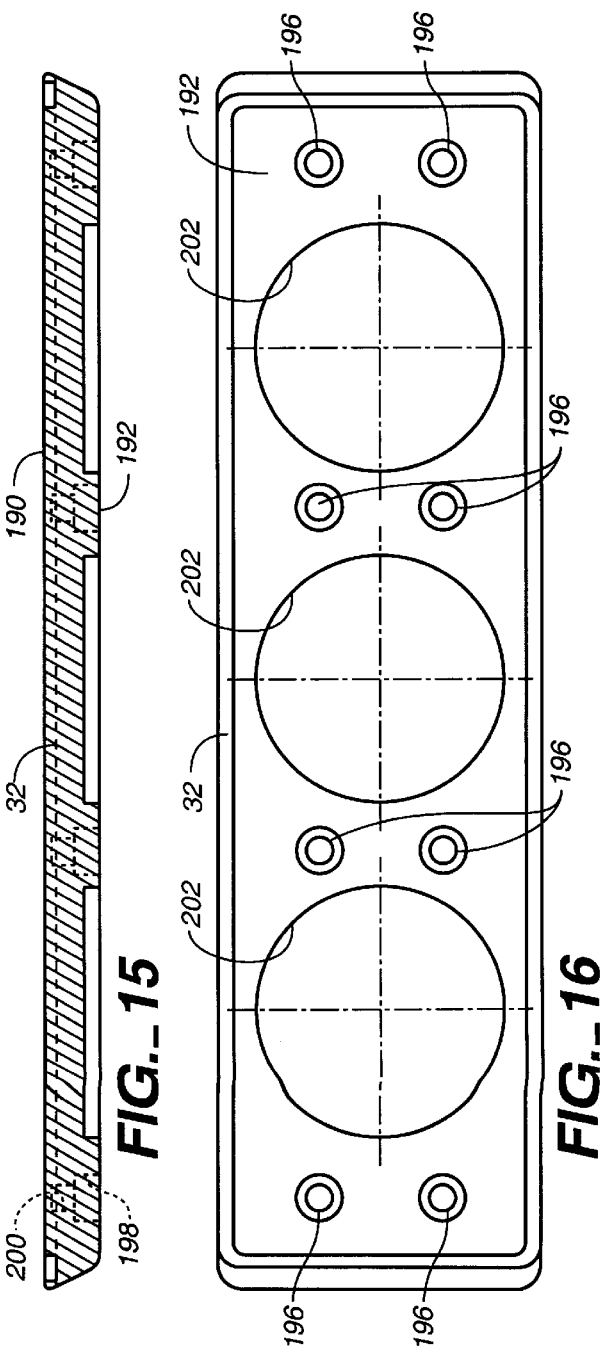

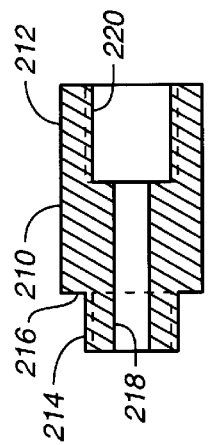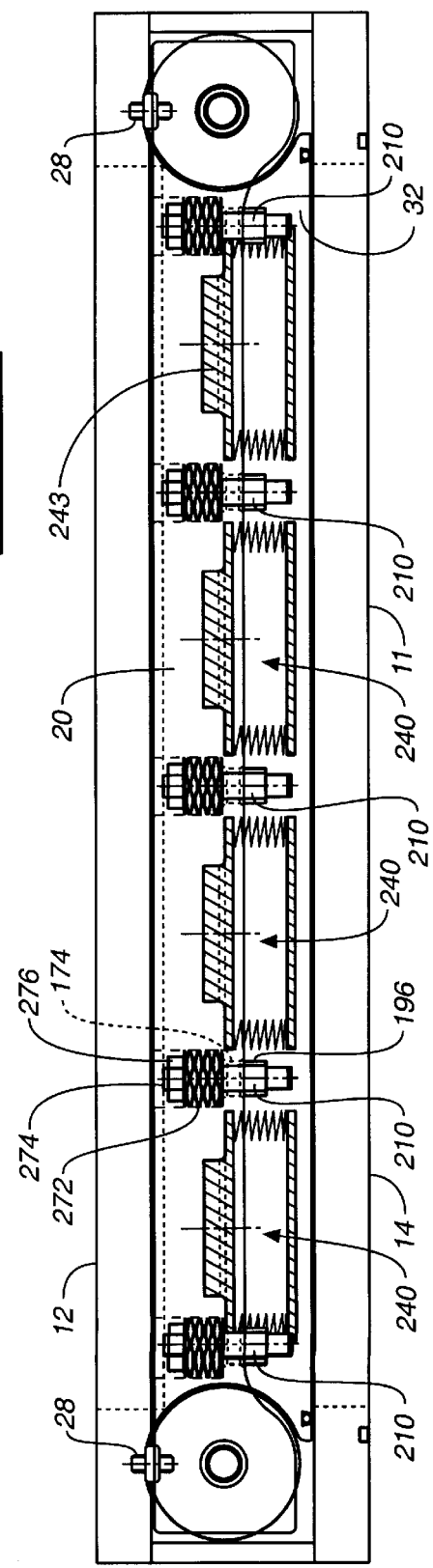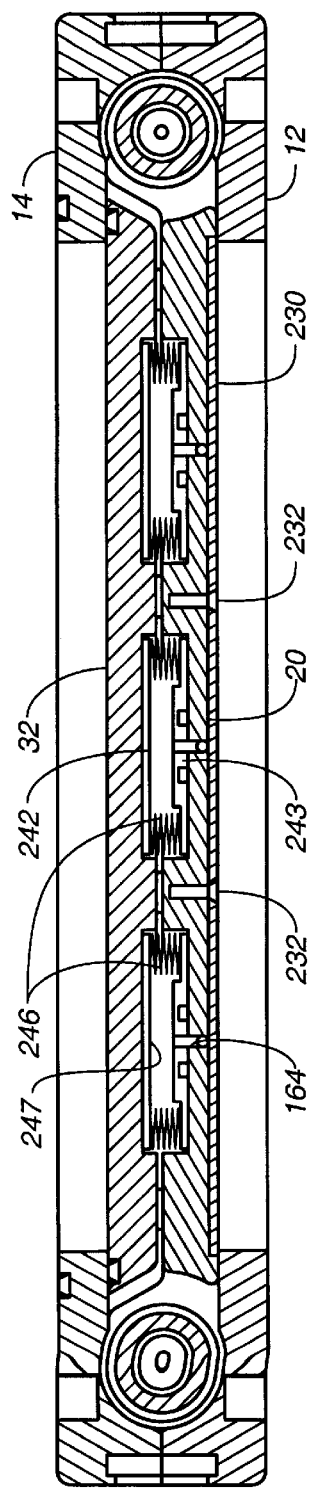

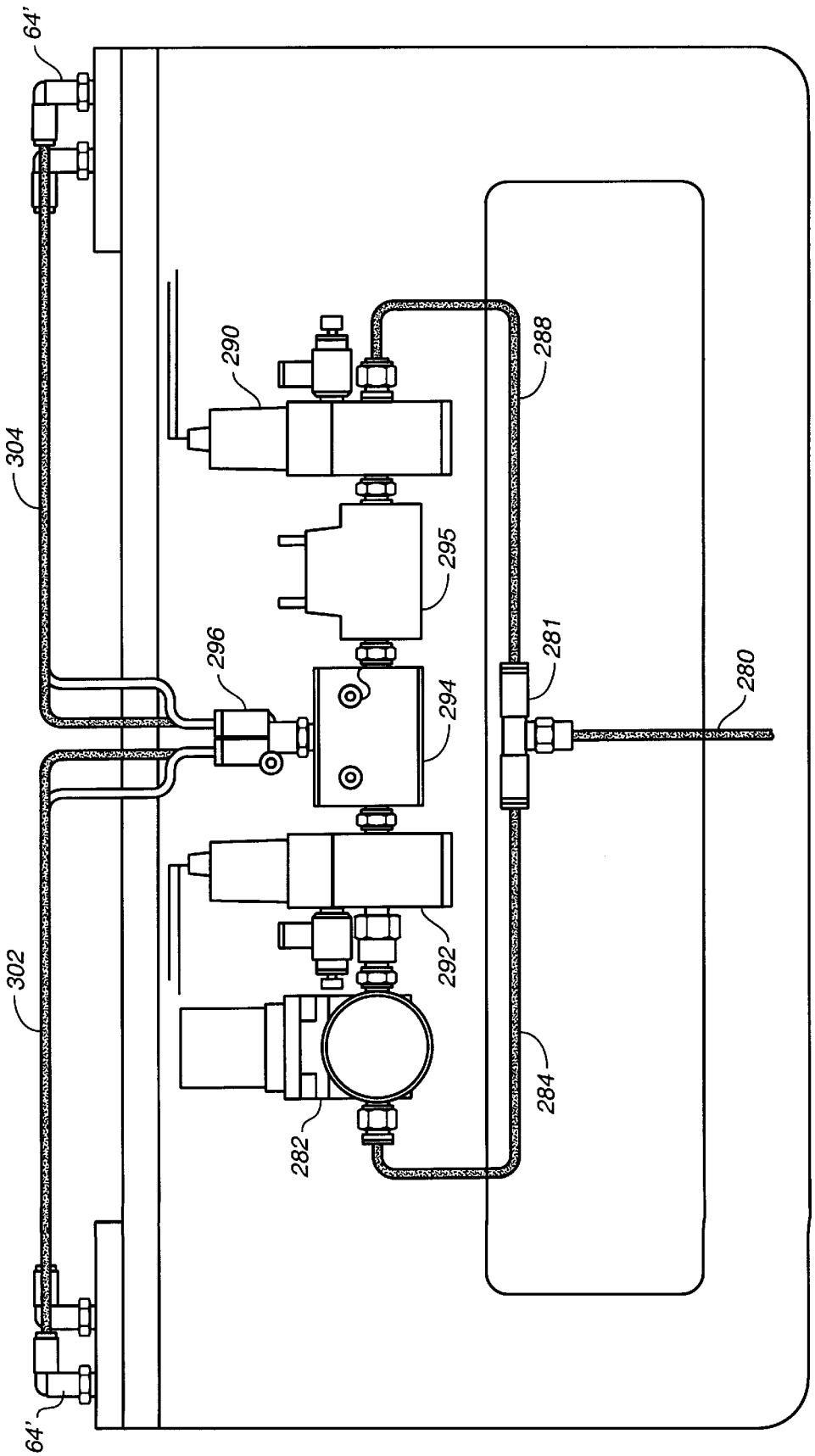

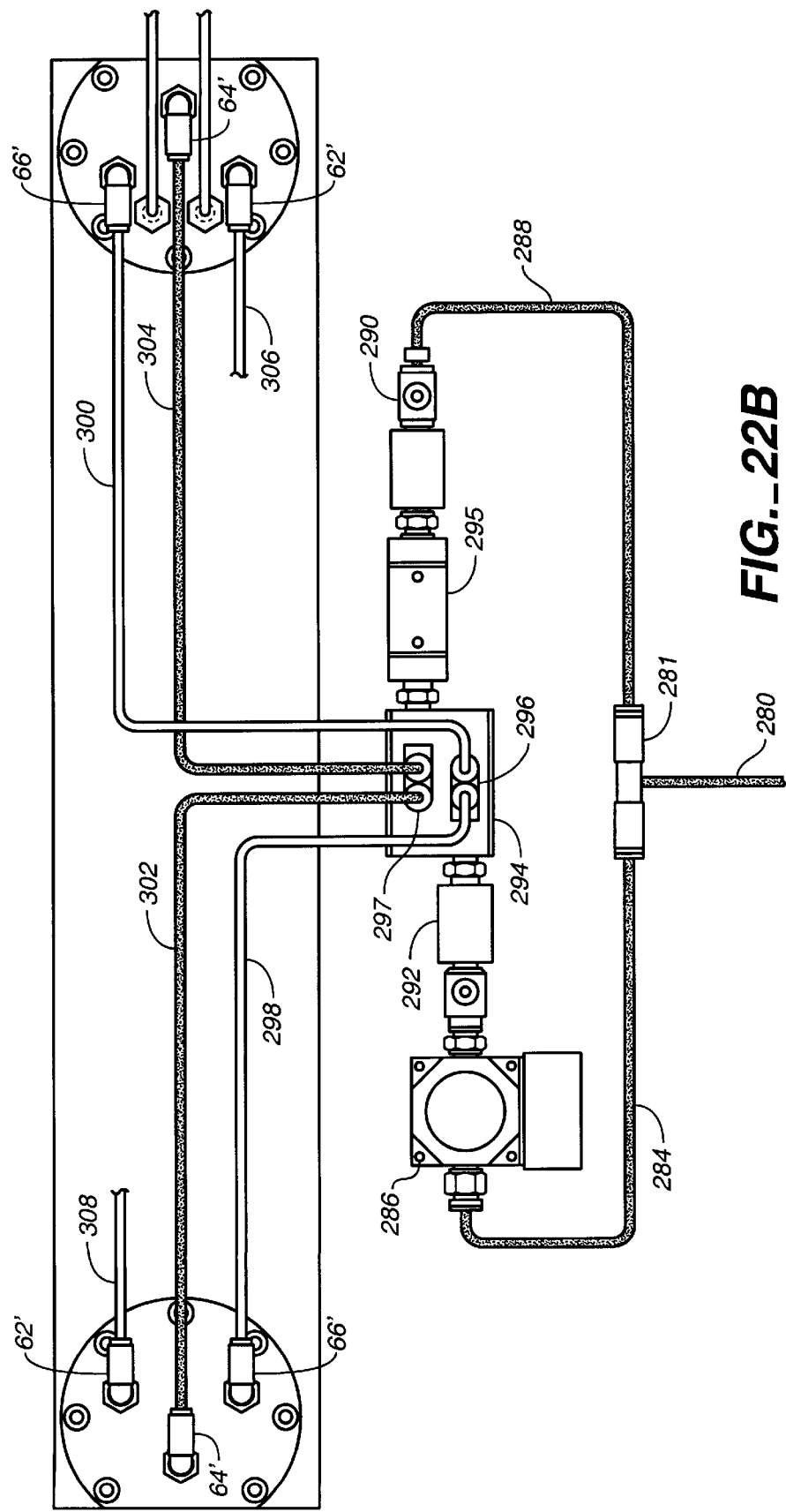
FIG._22B

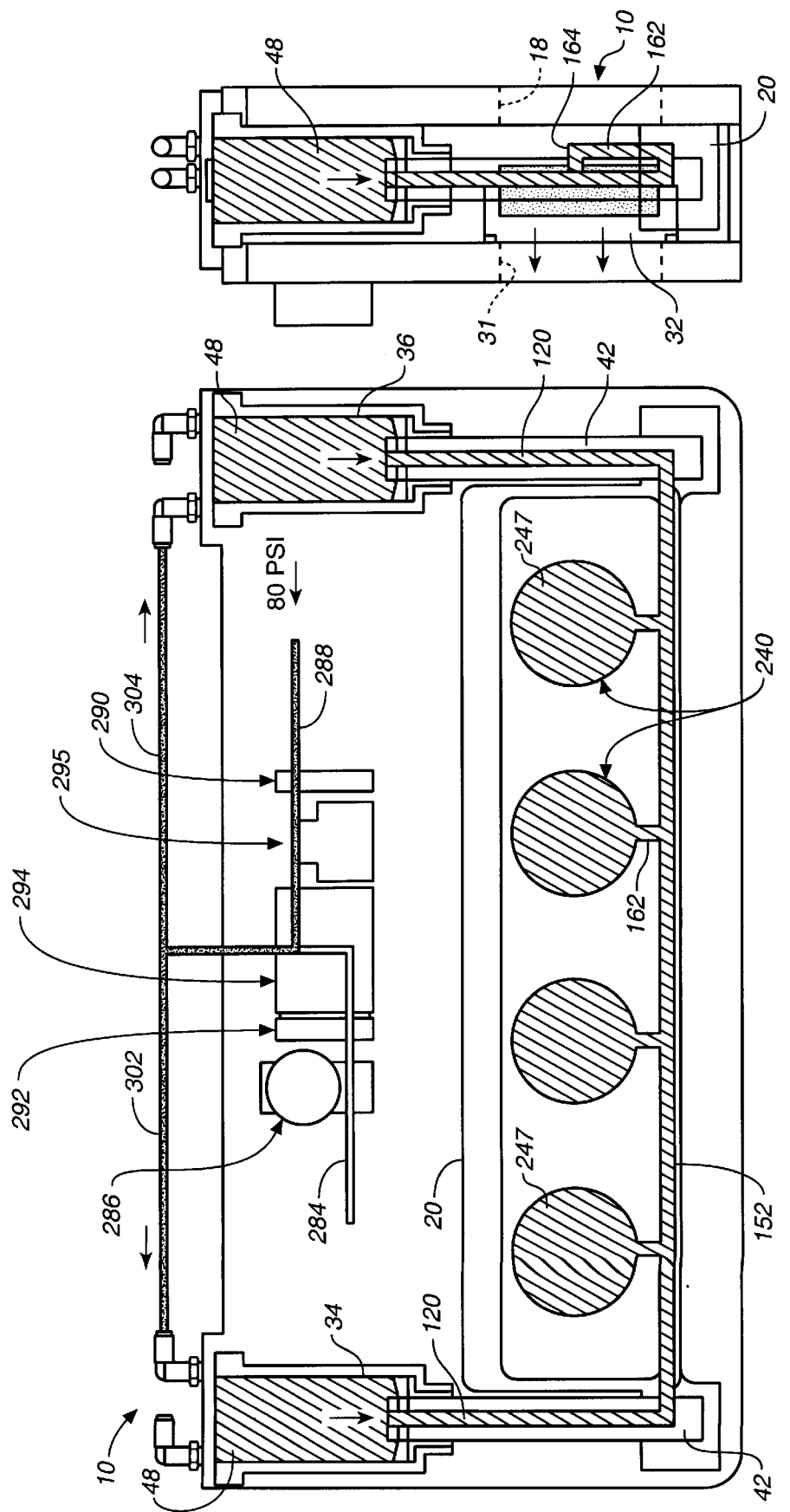
FIG._23B
FIG._23A

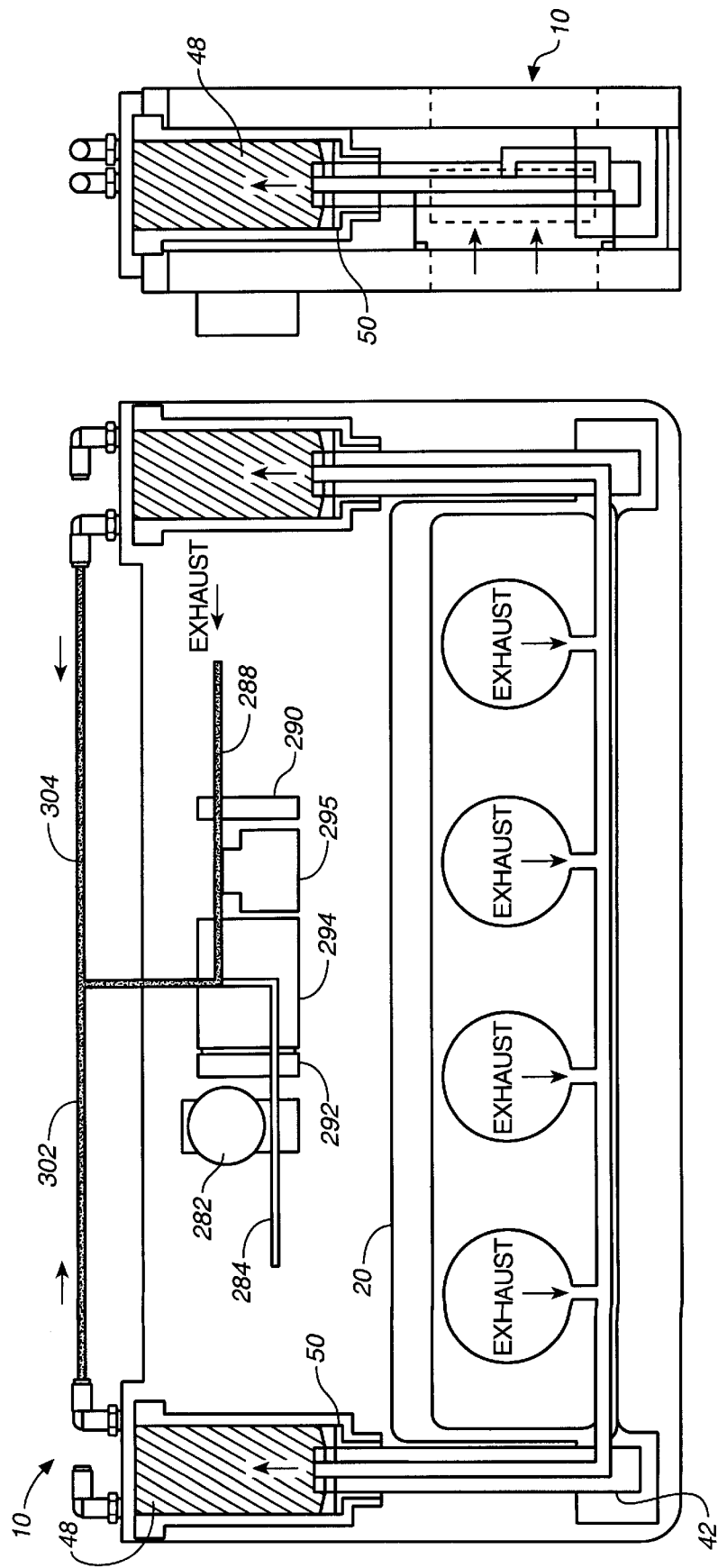

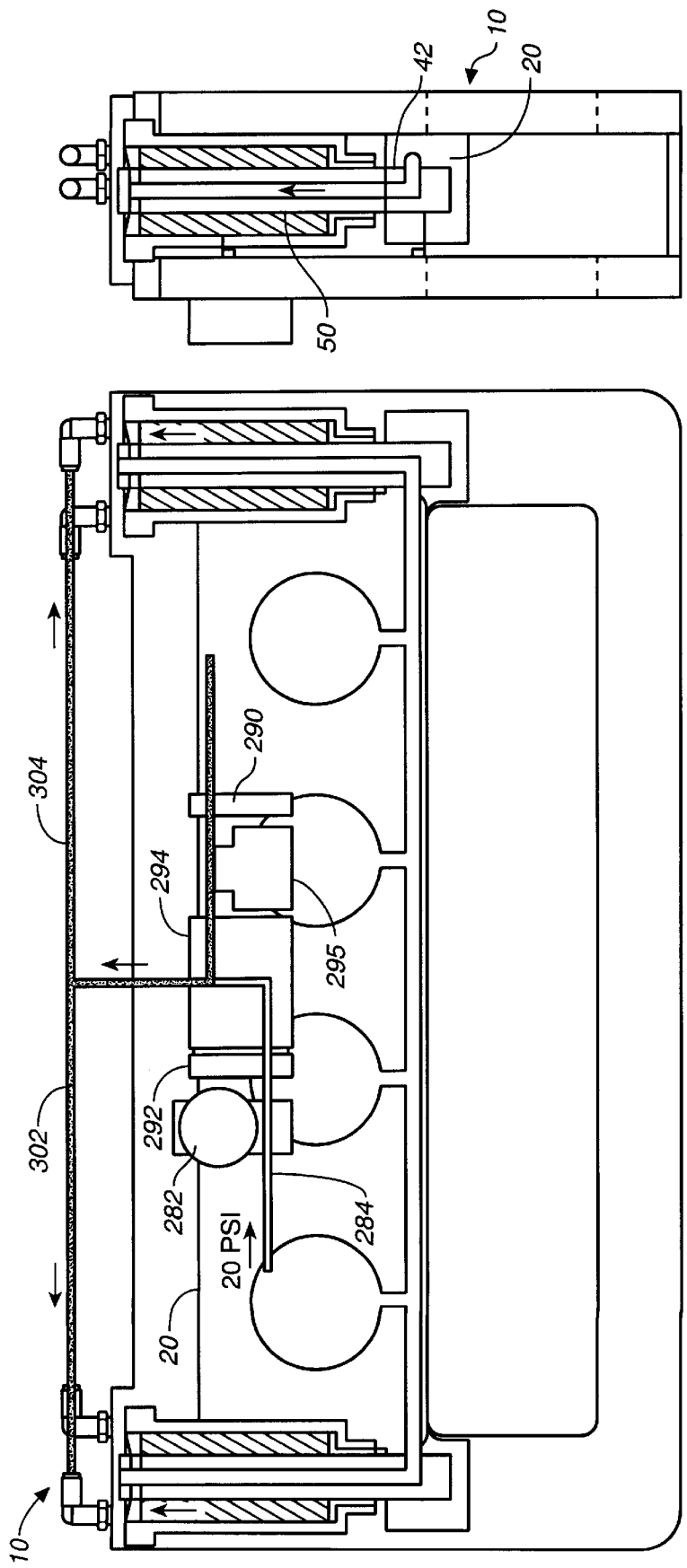
FIG._25B
FIG._25A

BELLOWS DRIVER SLOT VALVE

BACKGROUND OF THE INVENTION

1. Field of the Invention.

The present invention pertains to gate valves or slot valves of the type used in vacuum contained automated substrate handling systems, such as may commonly be employed in modular robotic wafer fabricating systems.

2. Related Art

In the semiconductor industry, automated silicon wafer substrate handling systems are utilized to move wafers into and out of process modules that perform various operations on the wafers, such as vapor deposition, ionization, etching, etc. These handling systems are commonly referred to as cluster tools, and an example of such a system is the Marathon Series cluster platforms available from Brooks Automation, Lowell, Mass., USA.

The processes performed on the wafers are done within vacuum chambers, and the cluster platforms and associated equipment are housed in "clean" rooms, the environments of which are strictly controlled. Vacuum chambers and clean rooms are utilized in order to prevent the smallest of particles from being introduced into the wafer matrices In addition, the wafer processing equipment of cluster tools is designed for low particulate generation through millions of cycles of operation. To achieve ultrapure fabrication techniques, processing equipment is employed that has a minimum of moving parts, and to further prevent particle contamination, machine componentry is properly isolated and sealed.

With clean rooms, space utilization is of utmost importance, as the costs for operating a clean room are extremely expensive. Accordingly, there is an advantage in providing more efficient equipment in less space, in order to lower manufacturing costs.

Gate valves (or slot valves) are commonly employed to provide vacuum seals at numerous locations between modular integrated processing equipment. For example, gate valves are positioned between wafer cassette modules and central handling modules, and between central handling modules and process modules. Gate valves open to allow transfer of wafers between modules, and close to seal off modules so that vacuum controlled processes may be performed within the modules.

Present gate valve assemblies include generally a gate valve housing and an actuator housing with associated controls. While these gate valve designs provide narrow profiles, allowing closely adjacent positioning of cooperating modules, the height of such gate valve assemblies can be extensive, which causes space utilization concerns below the processing equipment where associated controls and pumps are positioned. Accordingly, advantages can be achieved in space utilization by reducing the size of all processing and handling equipment, particularly gate valves. The action from components of the present valve are confined within a housing having a height considerably less than conventional actuating systems. This is accomplished, in part, by confining actuating elements within the housing.

SUMMARY OF THE INVENTION

Briefly described, the present invention comprises a slot valve for creating an air tight seal to a vacuum chamber, wherein the slot valve includes a valve housing defining a valve chamber. The valve housing has first and second aligned openings from one side of the valve housing to the other side. A valve holder is provided that is longitudinally reciprocable within the valve housing between a first holder position remote from the openings and a second holder position between the openings. The slot valve also includes a valve gate with a seal that is transversely reciprocable within the holder between a first gate position spaced from the openings and a second gate position sealing off one opening. A first actuator is provided within the valve chamber for moving the valve holder between first and second holder positions. A second actuator is carried on the valve holder for moving the valve gate between first and second gate positions. The first and second actuators are positioned within the valve housing, which creates a low profile housing for the slot valve.

According to an aspect of the invention, the second actuator is pneumatically powered to seat the valve gate into engagement about the first opening and is mechanically biased to unseat the valve gate out of engagement about the first opening.

According to another aspect of the invention, the second actuator comprises an expandable bellows chamber mounted at one end to the valve holder and mounted at its other end to the valve gate. The first actuator is pneumatically powered to move the valve holder between first and second holder positions. Pneumatic controls are provided for controlling operation of the first and second actuators. The pneumatic controls are adapted to deliver high pressure to the second actuator to seat the valve gate, with the high pressure being sufficient to overcome the mechanical biasing force attempting to unseat the valve gate.

Preferably, the pneumatic controls are adapted to apply a low pressure to the first actuator to move the valve holder between first and second holder positions. The first pneumatic actuator includes a first working chamber for receiving low pressure air to move the valve holder to the second holder position. The first working chamber of the first actuator and the second actuator are in fluid communication with each other. By controlling the first and second actuators via a common fluid source, the number of moving components necessary to seat the valve gate is substantially reduced.

The pneumatic controls are adapted to introduce high pressure air through the first working chamber of the first actuator and into the second actuator, to seat the valve gate and seal the opening. The first actuator includes a second working chamber for receiving low pressure air to move the valve holder from the second to the first holder position. Wherein upon introduction of low pressure air into the second working chamber of the first actuator, the first actuator does not move the valve holder back to the first holder position until high pressure in the first working chamber drops below the low pressure in the second working chamber, allowing time for the mechanical biasing force to unseat the valve gate.

Preferably, the mechanical biasing force unseats the valve gate at a pressure between the high and low pressures.

The present invention also includes a control system for moving a valve gate longitudinally between first and second holder positions into and out of a flow path and transversely between first and second gate positions into and out of seating engagement with a valve seat, for sealing off the flow path. The control system includes a first pneumatic actuator for moving the valve gate between the first and second holder positions into and out of the flow path. The first pneumatic actuator includes a first working chamber for moving the valve gate from the first to the second holder position into the flow path and a second working chamber for moving the valve gate from the second to the first holder position out of the flow path. The control system also includes a second pneumatic actuator for moving the valve gate into seating engagement with the valve seat. Biasing means is provided for biasing the valve gate to unseat from the valve seat. The second pneumatic actuator and the first working chamber of the first pneumatic actuator are in fluid communication with each other. The control system also includes a high pressure source for providing high pressure air to the first working chamber of the first actuator and to the second actuator, and a low pressure source for providing low pressure air to the first and second working chambers of the first actuator. The pressure necessary to overcome the biasing force of the biasing means to seat the valve gate is between the high and low pressures. In operation, low pressure introduced into the first working chamber moves the valve gate into the second position and high pressure introduced into the first working chamber and the second actuator overcomes the biasing force of the biasing means and seats the valve gate and seals the flow path. Introduction of low pressure into the second working chamber and venting of high pressure from the second actuator and the first working chamber first causes the biasing force to overcome the pressure in the second actuator and thereby causing the valve gate to unseat, and then causes the pressure in the first chamber to drop below the low pressure in the second working chamber, causing the valve gate to move out of the flow path.

These and other features, objects, and advantages of the present invention will become apparent from the following description of the best mode, when read in conjunction with the accompanying drawings, and the claims, which are all incorporated herein as part of the disclosure of the invention.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is a pictorial view of the slot valve assembly of the present invention;

FIG. 2 is a side elevation view of the slot valve assembly of FIG. 1, with a section of the housing cut away to show the strongback that carries the valve plate;

FIG. 3 is a sectional view, taken along the lines 3—3 of FIG. 2, showing the strongback and valve plate;

FIG. 4 is a sectional view, taken along the lines 4—4 of FIG. 5, showing the pneumatic actuators for raising and lowering the strongback and valve plate;

FIG. 5 is a top view of the slot valve assembly of FIG. 1, showing the pneumatic connections for the actuators of the slot valve assembly;

FIG. 6 is a sectional view, taken along the lines 6—6 of FIG. 2, showing the design of one of the pneumatic actuators for raising and lowering the strongback;

FIG. 7 is a side view of the piston rod of one of the pneumatic actuators;

FIG. 8 is a longitudinal sectional view of the piston rod of FIG. 7;

FIG. 9 is a side view of the strongback, shown without its various openings and recesses;

FIG. 10 is a top view of the strongback shown in FIG. 9;

FIG. 11 is a front side view of the strongback, shown with its openings and recesses;

FIG. 12 is a top view of the strongback of FIG. 11;

FIG. 13 is a back side view of the strongback of FIG. 11;

FIG. 14 is a front side view of the valve plate;

FIG. 15 is a longitudinal sectional view of the valve plate of FIG. 14;

FIG. 16 is a back side view of the valve plate of FIG. 14;

FIG. 17 is a cross-sectional view of the valve plate of FIG. 14;

FIG. 18 is a sectional view of the guide pin bushings that support and guide movement of the valve plate;

FIG. 19 is a sectional view, taken along the lines 19—19 of FIG. 2, showing the guide pin assemblies;

FIG. 20 is a sectional view, taken along the lines 20—20 of FIG. 2, showing the second pneumatic actuators;

FIG. 21 is a sectional view, taken along the lines 21—21 of FIG. 2;

FIGS. 22A and 22B are schematic diagrams of the pneumatic control system of the slot valve assembly of FIG. 1;

FIGS. 23A–25B are a series of schematic diagrams showing operation of the slot valve assembly of FIG. 1.

DETAILED DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that the preferred embodiments are not intended to limit the invention to those embodiments disclosed herein. On the contrary, the invention is intended to cover alternatives, modifications and equivalents, which may be included within the spirit and scope of the invention as defined by the appended claims.

Referring to FIG. 1, a slot valve assembly 10 is shown constructed in accordance with a preferred embodiment of the present invention. Slot valve assembly 10 includes a generally rectangular housing 11 that is relatively long and has a narrow profile. The narrow profile of housing 11 allows the placing of adjacent process and transfer modules in close proximity with each other, with slot valve assembly 10 therebetween. Housing 11 is formed by three-pieces. The first piece is a front housing plate 12. The second piece is a back housing plate 14, which has similar width and height dimensions to mate with front housing plate 12, to form the main body of housing 11. The third piece is a top bonnet plate 16, which forms a top cover for housing 11. Suitable fasteners and seals secure plates 12, 14 and 16 together and seal their joints to form a sealed interior valve chamber.

Front housing plate 12 includes an elongated rectangular opening 18, which is aligned with a similar elongated rectangular opening (not shown) in back housing plate 14. The aligned openings in the front and back housing plates form a central opening 19 in housing 11, through which robotic wafer or flat panel handling equipment can move to transfer wafers or the like between a transfer module and various process modules. The aligned openings forming central opening 19 also define a flow path through housing 11 through which gases move as adjacent module chambers are evacuated. An upright, elongated, and relatively flat rectangular strongback plate 20 is longitudinally movable up and down within the interior valve chamber of housing 11 between a first holder position remote from the aligned openings (i.e. out of the flow path) and a second holder position between the openings. Strongback 20 carries or supports a valve plate (not shown), and in this sense acts as a valve holder. Strongback 20 is raised and lowered by internal actuators to the position shown in FIG. 1. Pneumatic fittings and ports, indicated generally by reference numeral 22, communicate with the pair of internal pneumatic actuators used to raise and lower strongback 20. When the strongback 20 is moved to the position shown in FIG. 1, the valve plate is in position to be moved forwardly, or transversely, from a first gate position between the aligned openings to a second gate position in sealing engagement about the opening in back housing plate 14.

Housing pieces 12, 14 and 16 include a series of recesses 24 that include inwardly directed flanged rims, which cooperate with various types of clamp mechanisms to secure slot valve assembly 10 in position between system modules.

In FIG. 2, the opening 31 in back housing piece 14 is framed by a seal receiving groove 26, which receives a suitable elastomeric seal for sealing between the valve plate side of slot valve assembly 10 and an adjacent module. Front housing piece 12 includes a similar groove framing its corresponding opening for receiving a like elastomeric seal, for sealing between the strongback side of slot valve assembly 10 and a second, adjacent module.

In FIG. 2, a portion of back housing piece 14 is cut-away to show a pair of contact heads 28 mounted in front housing piece 12. As discussed in more detail with reference to FIG. 19, contact heads 28 are engaged by the strongback plate when the valve plate is moved into sealing engagement with back housing plate 14. It is proposed to have an aluminum version and a stainless steel version of the slot valve assembly of the present invention. Of course other materials of suitable strength may by used as well to fabricate the slot valve assembly. For the aluminum version, wherein housing pieces 12, 14, 16, strongback 20 and the valve plate are aluminum, it is preferable to provide stainless steel contact heads, to reduce wear between front housing piece 12 and strongback 20.

In FIG. 3, the elongated rectangular opening 18 of front housing piece 12 can be seen to be aligned with the similar elongated rectangular opening 31 in back housing plate 14. Openings 18, 31 form the central opening 19 of the slot valve assembly. Opening 19 can be said to define a flow path through which gases are moved (either evacuated or introduced) and along which handling equipment moves to transfer wafers or other types of substrates between modules. The elongated valve plate is referenced by numeral 32 and is shown positioned adjacent back housing plate 14. Valve plate 32 is slightly longer and higher than opening 31. In sealing position about opening 31, valve plate 32 functions as the gate that seals off the slot valve assembly.

Valve plate 32 and strongback 20 extend between a pair of first pneumatic actuators 34, 36. As discussed in more detail later, strongback 20 is mounted between the vertically movable piston rod components of actuators 34, 36, and valve plate 32 is horizontally slidably carried on strongback 20 and is movable into sealing engagement with the housing by a set of second pneumatic actuators also carried on strongback 20.

As shown in FIG. 4, it should be appreciated from the discussion herein that first pneumatic actuators 34, 36 are largely identical to each other. Each actuator 34, 36 includes a cylinder body 38, a piston 40, and a piston rod 42. The distal ends 44 of piston rod 42 are mounted to lateral flange portions 46 of strongback 20. Cylinders 38 and pistons 40 of each actuator 34, 36 define a first working chamber 48 and a second working chamber 50. In FIG. 4, second working chamber 50 of each actuator 34, 36 is not readily seen because pistons 40 are shown bottomed out with piston rods 42 in a fully extended position. In this second holder position, strongback 20 is moved over opening 18 in the front housing plate.

Each actuator 34, 36 has associated with it a set of pneumatic fittings and ports 22, which provide for fluid communication between working chambers 48, 50 and pneumatic hoses (not shown). Cap pieces 52, 54 are mounted over end sections 56, 58 of bonnet plate 16. Each cap piece 52, 54 closes off a first working chamber 48 of each first actuator 34, 36. Cap pieces 52 54 also include ports that receive fittings for coupling pneumatic lines to the actuators.

FIG. 4 also shows the interior valve chamber 33 of slot valve assembly 10. Strongback 20 carries the valve plate within valve chamber 33 and actuator assemblies 34, 36 extend down into valve chamber 33. As adjacent process modules and transfer modules are vacuum sealed, valve chamber 33 likewise is vacuum sealed. An important aspect of the present invention is the provision of actuator assemblies 34, 36 within the vacuum environment of valve chamber 33. This significantly reduces the size of the slot valve assembly, yet still provides for full travel of the valve plate.

FIG. 5 is a top plan view of slot valve assembly 10 showing the fittings and ports 22 for the first pair actuators. Each cap piece 52, 54 includes a first pneumatic port 62 and corresponding fitting 62', which communicate with a bellows enclosure chamber for the piston rod of the actuator. Each cap piece 52, 54 also includes a second pneumatic port 64, which provides fluid communication with the first working chamber of each actuator. The corresponding fitting for port 64 is also provided but is not shown. Each cap piece 52, 54 also includes a third pneumatic port 66 and fitting 66', which provide fluid communication to the second working chamber of the actuators. Cap piece 54 further includes a first sensor port 70, which is associated with a first reed switch that is positioned to determine when the piston of its associated actuator bottoms out, and a second sensor port 72, which is associated with a second reed switch that is positioned to determine when the same piston has moved to a predetermined position associated with a raised position of the strongback and valve plate. Ports 62 and 66 are similar to port 64.

FIG. 6 illustrates the design of actuator 36. Actuator 36 is the actuator that does not have reed switches place therein, though actuator 36 could have reed switches if desired. Other than the reed switches, actuators 34, 36 are identical. Cylinder component 38 is essentially a tubular member having an upper flange 80 that is received within a wider diameter bore 82 of bonnet plate 16. Spaces are provided for a seal between flange 80 and bonnet 16. Cylinder component 38 is open at its upper end as shown in the figure, and cap piece 52 closes off cylinder component 38 and in this manner partially defines first working chamber 48. Spaces are also provided for sealing between cap piece 52 and cylinder component 38. Cylinder component 38 includes an opposite closed end 84 that includes a central opening 86 for receiving piston rod 42. Spaces are provided for sealing between piston rod 42 and closed end 84, and between piston 40 and the interior wall of cylinder component 38.

A pair of expandable steel bellows 90, 92 are provided for enclosing and sealing piston rod 42. One end of bellows 90 is mounted in a sealed manner to a bellows end flange 94 that is mounted to the closed end 84 of cylinder component 38. One end of bellows 92 is mounted in a sealed manner to an annular lock ring 96 that is secured within an annular groove in piston rod 42. Lock ring 96 engages strongback 20 and when piston rod 42 is extended causes the strongback to move into position over the central opening of the slot valve assembly. A tubular bellows guide sleeve 98 has an outwardly extending flange 100 and is slidably movable on piston rod 42. Bellows 90, 92 are mounted at their inner ends to opposite sides of flange 100. Flange 100 includes a set of four openings 102 (only two shown) for providing fluid communication between the chambers 103, 105 formed by bellows 90 and 92.

Cylinder component 38 includes a first longitudinal side wall bore 104, which extends the length of the cylinder. Bore 104 communicates at one end with port 62 and fitting 62', and at its other end with bellows chambers 103, 105. Cylinder end wall 84 and bellows flange 94 include ports (not shown) that define a channel providing fluid communication between chambers 103, 105 and bore 104. Bore 104 allows bellows chambers 103, 105 to breathe as the piston rod is extended and retracted.

Cylinder component 38 includes a second longitudinal bore 110, which extends substantially the length of the cylinder, and is located opposite to bore 104. Bore 110 terminates at cylinder end wall 84. For actuator 36, bore 110 is nonfunctional. However, actuator 34 includes a similar bore which provides access for positioning a reed switch or other type of sensor (not shown) adjacent the closed end 84 of cylinder component 38. The reed switch within bore 110 functions to signal when piston 40 bottoms out against cylinder end wall 84.

Referring back to FIG. 4, cylinder component 38 of both actuators 34, 36 includes a third shorter bore 112 that extends approximately half-way into or along the length of cylinder component 38. For actuator 34, bore 112 aligns with port 72 in cap piece 54 and allows for the provision of a second reed switch approximate the open end of cylinder component 38. For actuator 36, bore 112 is non-functional, but could be used for placement of a reed switch or other type of sensor, if desired.

Cylinder component 38 includes a fourth longitudinal bore 114 that communicates at one end with port 66 and fitting 66' and at its other end communicates with second working chamber 50 via a transverse channel 116.

Referring back to FIG. 6, it can be seen that strongback 20 is positioned spaced from the interior surfaces of housing pieces 12, 14. As piston rod 42 is extended and retracted, moving strongback 20 up and down between first and second holder positions, strongback 20 does not contact housing plates 12, 14, which ensures that no loose particles are generated by metal-to-metal contact.

FIGS. 7 and 8 show the design of piston rod 42. Piston rod 42 includes a longitudinal bore 120 that extends from a cylinder end 122 to a point spaced from a strongback end 124 of piston rod 42. The strongback end 124 of piston rod 42 includes an annular groove 128 and a transverse port 130 that provide fluid communication between longitudinal groove 120 and a fluid passageway in the strongback. A set of three annular O-ring grooves 132, 134, 136 are provided to seal between piston rod 42 and lock ring 96 and the two component pieces of the strongback, discussed later.

FIGS. 9 and 10 illustrate the design of strongback 20. Strongback 20 is formed of two component pieces, a top piece 140 and a bottom piece 142. Bottom piece 142 is an elongated, flat, substantially rectangular plate that has a pair of dowel sockets 144 and piston rod openings 148, 150. Top piece 140 includes a pair of matching aligned dowel sockets 144' and a pair of matching piston rod openings 148', 150'. A pair of dowels 146 are positioned within sockets 144, 144' to align top piece 140 with bottom piece 142 during the assembly of strongback 20. With top piece 140 mounted on bottom piece 142, the two pieces are secured together by an aluminum brazing process.

Top piece 140 includes a longitudinal slot or groove 152 that has angled outer ends sections 153. Outer end sections 153 terminate at flange openings 148', 150'. Grooves 152, 153 form a longitudinal fluid passageway within strongback 20 and thus provides fluid communication between openings 148', 150'. The longitudinal bore and annular groove of each piston rod are in fluid communication with longitudinal groove 152. Thus, the first working chambers of the first pneumatic actuators are in fluid communication with each other via longitudinal groove 152, 153, which serves to balance the pressures within the working chambers of each actuator and thus equalize the actuator forces at each end of strongback 20.

Top piece 140 includes end flanges 154, 156 and a main body section 158. End flanges 154, 156, together with the outer end portions of bottom piece 142, form the flanges 46 of strongback 20. Main body section 158 is narrower than end flanges 154, 156 (FIG. 10). The narrow body of strongback 20 provides space, as shown by arrows 160, for positioning the valve plate within the footprint of strongback 20.

The main body 158 of strongback 20 further includes a set of three vertical passageways 162 that communicate with longitudinal passageway 152, and a set of three upper short passageway segments 164, which communicate with vertical passageways 162 and with the second set of pneumatic actuators carried on strongback 20.

In FIGS. 9 and 10, strongback 20 is, for clarity, not shown with its numerous openings and recesses or pockets. FIGS. 11–13 show strongback plate 20 with all the holes and recesses that are formed in the strongback. Strongback 20 includes a front side 170 and a back side 180. Front side 170 faces outwardly of the slot valve assembly and back side 180 faces the valve plate. Front side 170 includes a substantially rectangular elongated recess 172, which receives a cover plate (not shown) after the components of the second actuators are installed. Within the pocket of recess 172, a set of eight guide pin openings 174 are arranged in pairs and equally spaced as pairs across the length of top piece 140. Each guide pin opening 174 includes a larger diameter bore 176 adjacent front side 170 and a smaller inner diameter bore 178 adjacent back side 180. Recess 172, and bores 176, 178 create openings extending completely through top piece 140.

Back side 180 of top piece 140 includes three laterally spaced large circular pockets 182. Within each pocket 182 is formed a set of four small openings 184. Each opening 184 is equally spaced from transverse conduit 164. Pockets 182 each receive one end of a second pneumatic actuator, which is secured to strongback 20 by means of fasteners that extend through openings 184.

Top piece 140 also includes a set of four contact head bores 186, which for the aluminum version of the slot valve assembly, receive 440 stainless steel contact heads (not shown). The contact heads engage the inner sidewall of the front housing plate when the valve plate is seated against the back housing plate.

FIGS. 14–17 illustrate the design of valve plate 32. Valve plate 32 includes a front side 190 and a back side 192. Front side 190 faces outwardly of the slot valve assembly and back side 192 faces the strongback. Front side 190 includes a rectangular groove 194 that is spaced inwardly from the peripheral edge of valve plate 32. Groove 194 is a dovetail groove that is designed to receive an elastomeric seal for sealing valve plate 32 against an inner sidewall of the back housing plate of the slot valve assembly. Front side 190 also includes a set of eight guide pin holes 196 that align with guide pin holes 174 of strongback 20. Guide pin holes 196 include a large diameter bore section 198 and a small diameter bore section 200. Back side 192 includes three equally spaced large circular pockets 202. Pockets 202 align with the pockets 182 of strongback 20. Pockets 202 each receive an end of a second actuator.

FIG. 18 illustrates the design of a guide pin bushing 210 that is received in each of the openings 174 of strongback 20 and openings 196 of valve plate 32. Guide pin bushings 210 include a large diameter portion 212 and a small diameter, externally threaded portion 214, the junction of which forms shoulder 216. A small diameter central bore 218 is formed through small diameter portion 214 and a portion of large diameter portion 212, and a large diameter bore 220 is formed in the outer half of large diameter portion 212. Large diameter bore 220 is internally threaded.

FIG. 19 shows the assembly of valve plate 32 on strongback 20 via guide pin bushings 210. The externally threaded end 214 of each guide pin 210 is threadably secured within an opening 196 of valve plate 32. The large diameter portion 212 of each guide pine 210 slidably moves within an opening 174 of strongback 20. A coil wave spring 272 is positioned around each guide pin 210 with its inner end abutting the shoulder formed in opening 174. A bolt 274 including a head 276 is threaded into the internally threaded bore of guide pin 210. Head 276 compresses coil spring 272, which creates a biasing force that biases valve plate 32 against strongback 20 and away from seated engagement with housing 11.

FIG. 19 also shows contact heads 28. When bellows chambers 240 expand, as discussed in more detail with reference to FIGS. 20, 21, contact heads 28 engage the inner side wall of front housing plate 12, to provide a counterbalance force to urge valve plate 32 into seated engagement with the inner side wall of back housing plate 14.

FIGS. 20 and 21 illustrate the assembled design of strongback 20 and valve plate 32. A cover plate 230 is secured to strongback 20 by means of screws 232. Received within confronting pockets 182 of strongback 20 and pockets 202 of valve plate 32 is a second pneumatic actuator 240. Each pneumatic actuator 240 includes a front bellows plate 242, which butts up against the back side 192 of valve plate 32, and a back bellows plate 243, which is secured to strongback 20 by means of screws that are received within openings 184 (FIG. 11). A stainless steel bellows 246 is mounted between opposite surfaces of bellows flanges 242, 243 to form a working bellows chamber 247. Bellows chamber 247 communicates with transverse passageway 164 and vertical conduit 162. In operation, air introduced into bellows chamber 247 acts against bellows plate 242, closing valve plate 32 by moving it into sealing engagement with the inside wall 250 of back housing plate 14. Elastomeric seal 252 creates a sealing interface between valve plate 32 and inside wall 250.

In FIG. 21, it can be seen that front housing plate 12, back housing plate 14 and bonnet cover 16 form an interior valve chamber 256. Seals 258 seal between bonnet cover 16 and the front and back housing plates. The bottom edges 260, 262 of the front and back housing plates are welded together by an aluminum brazing process. During operation of the wafer or substrate handling system in which slot valve assembly 10 is installed, valve chamber 256 remains at the same pressure as the module adjacent the strongback side of the slot valve assembly. In other words, only opening 31 is sealed by movement of valve plate 32.

Referring to FIGS. 22A and 22B, the pneumatic control system for the slot valve assembly includes an incoming air line 280 leading to a splitter 281. An air line 284 connects one air port of splitter 281 with a pressure regulator 286. Another air line 288 connects the other air port of splitter 281 with a three-way solenoid valve 290. A second three-way solenoid valve 292 communicates with pressure regulator 282 and with a manifold block 294. A slow start control valve 295 is positioned in fluid communication between solenoid valve 292 and manifold block 294.

In a first of their two positions, solenoid valves 290, 292 connect lines 284, 288 with manifold block 294, and in the second of their two positions, solenoid valves 290, 292 block lines 284, 288, and vent the lines leading from manifold block 294.

A second splitter 296 connects with pneumatic lines 298, 300, which lead to fittings 66' and provide fluid communication with the second working chambers of the first pneumatic actuators. Pneumatic lines 302, 304 lead from a third splitter 297 to fittings 64' and provide fluid communication with the first working chambers of the first pneumatic actuators. Lines 306, 308 connect with fittings 62' and vent the bellows chambers enclosing the piston rods of the first pneumatic actuators.

FIGS. 23A–25B illustrate operation of slot valve assembly 10. In FIG. 23A, 80 psi air is introduced through line 288 to solenoid valve 292. With solenoid valve 290 in its first position, 80 psi pressure is introduced to slow start control valve 295, which for a predetermined period of time, meters out approximately 40 psi pressure through into manifold 294 and into lines 302, 304. 40 psi pressure is introduced into first working chambers 48 of actuators 34, 36, into conduits 120 of each piston rod 42, and through conduits 152, 162, 164 of strongback 20 into working chambers 247 of second pneumatic actuators 240. The 40 psi pressure in first working chambers 48 is sufficient to move the piston of each first actuator and thereby move strongback 20 from its first holder position to its second holder position between openings 18, 31. However, 40 psi pressure in working chambers 247 of the second actuators is not sufficient to overcome the biasing forces of the spring coils on the strongback. Hence, valve plate 32 remains in its first gate position retracted away from opening 31. Meanwhile, solenoid valve 292 is switched to block line 284 and to vent the line leading from manifold block 294. With solenoid valve 292 in this position, the second working chambers of each first pneumatic actuator are vented to atmosphere.

After a predetermined time, slow start control valve 295 will cease metering pressure, allowing 80 psi pressure to move all the way into working chambers 247 of the second actuators. 80 psi pressure is sufficient to overcome the biasing forces of the spring coils, and valve plate 32 moves to its second gate position into seating engagement with the inner wall of the housing, as shown in FIG. 23B. The slow start control valve provides time for the piston rods to extend and position the strongback and valve plate into position about the openings in the housing.

Referring to FIG. 24A, when the valve plate is to be unseated, solenoid valve 290 switches to vent lines 302, 304, which vents first working chambers 48. Solenoid valve 292 is switched to introduce 80 psi pressure into lines 298, 300, which provides 80 psi working pressure into second working chambers 50 of the first actuators. However, due to the surface area differential of the opposed working surfaces of the pistons of each first actuator, piston rods 42 remain extended for a short period of time while the pressure drops in first working chambers 48.

Meanwhile, the spring coils are selected to overcome a pressure that is greater than the pressure at which the pistons of the first actuators will start to move to retract the piston rods. Such a pressure may be for example 65 psi. When the bellows chambers 247 drop below this pressure, the spring coils retract valve plate 32, unseating it from the housing, as shown in FIG. 24B.

When the pressure in the first working chambers drops to approximately 50 psi, the pressure differential acting on the pistons is sufficient to retract the pistons and their piston rods into the cylinders, as shown in FIGS. 25A and 25B. This raises (or lowers) the strongback and valve plate away from the openings in the housing.

From the foregoing description, it can be seen that a compact slot valve assembly is provided that includes a minimum of moving parts and which is pneumatically controlled in a manner that substantially reduces the potential for particulate buildup.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A slot valve for creating an air tight seal to a vacuum chamber, comprising
    a valve housing defining a valve chamber, the valve housing having first and second aligned openings for passage of air along a flow path from one side of the valve housing to the other side,
    a valve holder longitudinally reciprocable within the valve housing between a first holder position remote from said openings and a second holder position between said openings,
    a valve gate including a seal transversely reciprocable within said holder between a first gate position spaced from said openings and a second gate position sealing off one opening,
    a first actuator within the valve chamber for moving the valve holder between first and second holder positions, and
    a second actuator carried on the valve holder for moving the valve gate between first and second gate positions,
    the first and second actuators being within the valve chamber, and
    the slot valve having a low profile.

2. The valve of claim 1, which further comprises pneumatic means to seat the valve gate into engagement about one of the openings and mechanically biased means to unseat the valve gate out of engagement about said opening.

3. The valve of claim 2, wherein the second actuator comprises an expandable bellows chamber mounted at one end to the valve holder and mounted at its other end to the valve gate.

4. The valve of claim 3, wherein the first actuator is pneumatically powered to move the valve holder between first and second holder positions.

5. The valve of claim 4, and further comprising pneumatic controls for controlling operation of the first and second actuators, the pneumatic controls applying high pressure to the second actuator to seat the valve gate, the high pressure being sufficient to overcome the mechanical biasing force attempting to unseat the valve gate.

6. The valve of claim 5, wherein the pneumatic controls are adapted to apply a low pressure to the first actuator to move the valve holder from the first holder position to the second holder position, the first pneumatic actuator including a first working chamber for receiving low pressure air to move the valve holder to the second holder position, the first working chamber of the first actuator and the second actuator being in fluid communication with each other.

7. The valve of claim 6, wherein the pneumatic controls are connected to introduce high pressure air through the first working chamber of the first actuator and into the second actuator, to seat the valve gate, and wherein the first actuator includes a second working chamber for receiving low pressure air to move the valve holder to the first holder position, and contact means to prevent the first actuator from moving the valve holder from the second to the first holder position until the high pressure in the first working chamber drops below the low pressure in the second working chamber, allowing time for the mechanical biasing force to unseat the valve gate.

8. The valve of claim 7, wherein the mechanical biasing force unseats the valve gate at a pressure between the high and low pressures.

9. The valve of claim 1, wherein the valve holder is spaced from the valve housing as the valve holder reciprocates between the first and second positions.

10. A control system for moving a valve gate longitudinally between first and second holder positions into and out of a flow path and transversely between first and second gate positions into and out of seating engagement with a valve seat, for sealing off the flow path, the control system comprising
    a first pneumatic actuator for moving the valve gate between the first and second holder positions into and out of the flow path, the first pneumatic actuator including a first working chamber for moving the valve gate from the first to the second holder position into the flow path and a second working chamber for moving the valve gate from the second to the first holder position out of the flow path,
    a second pneumatic actuator for moving the valve gate into seating engagement with the valve seat,
    biasing means for biasing the valve gate to unseat from the valve seat, the second pneumatic actuator and the first working chamber of the first pneumatic actuator being in fluid communication with each other,
    a high pressure source for providing high pressure air to the first working chamber of the first actuator and to the second actuator, and
    a low pressure source for providing low pressure air to the first and second working chambers of the first actuator,
    the biasing means applying a force to bias the valve gate to the second gate position, the biasing means being overcome by pressure in the second between the high and low pressures, means to introduce low pressure into the first working chamber to move the valve gate into the second holder position and high pressure into the first working chamber and into the second actuator to overcome the biasing force of the biasing means and seat the valve gate and seal the flow path, and means to introduce low pressure into the second working chamber and vent high pressure from the second actuator and the first working chamber, to first cause the biasing force to overcome the pressure in the second actuator, then causing the valve gate to unseat, and then causing the pressure in the first chamber to drop below the low pressure in the second working chamber, causing the valve gate to move to the first holder position.

11. The control system of claim 10, and further comprising a slow start control valve between the high pressure source and the first working chamber, the slow start control valve adapted to deliver low pressure air to the first working chamber for a period of time until the first actuator is fully expanded, and then deliver high pressure air to the first working chamber.

12. The control system of claim 10, wherein the biasing means includes a set of coil springs.

13. The control system of claim 10, wherein the first actuator includes a piston and a piston rod, and wherein the piston rod is hollow and at one end communicates with the first working chamber and at the other end includes an opening that communicates with the second actuator.

14. The control system of claim 13, wherein the valve gate is carried on a valve holder and the valve holder is mounted to the piston rod, and the valve holder includes an internal manifold that provides fluid communication between the piston rod and the second actuator.

15. The control system of claim 14, wherein the second pneumatic actuator comprises a bellows chamber mounted at one end to the valve gate and at the other end to the valve holder.

16. A pneumatic slot valve for sealing off a vacuum chamber, the slot valve comprising a valve housing defining a valve chamber, the valve housing having first and second aligned openings defining a flow path for the passage of air from one side of the valve housing to the other side, a valve gate movable into and out of seating engagement with the valve housing about the first opening, to seal off the flow path, a first pneumatic actuator within the valve chamber for moving the valve gate into and out of the flow path, the first pneumatic actuator comprising a linear pneumatic motor having a first working chamber for moving the valve gate into the flow path and a second working chamber for moving the valve gate out of the flow path, a second pneumatic actuator for moving the valve gate into seating engagement with the valve housing about the first opening, a valve holder for carrying the valve gate and the first pneumatic actuator, the second pneumatic actuator and the first working chamber of the first pneumatic actuator being in fluid communication with each other, the second pneumatic actuator including biasing means for unseating the valve gate, a high pressure source in fluid communication with the first working chamber for seating the valve gate, a low pressure source in fluid communication with the first and second working chambers of the first pneumatic actuator, for moving the valve holder into and out of the flow path, wherein the pressure necessary to overcome the biasing force of the biasing means is between the high and low pressures provided by the high and low pressure sources.

17. The slot valve of claim 16, wherein the low pressure source comprises a slow start valve positioned between the high pressure source and the first working chamber, the slow start valve adapted to meter low pressure air to the first working chamber, to move the valve holder into the flow path.

18. The slot valve of claim 16, wherein the first pneumatic actuator includes a piston and a piston rod, and wherein the valve holder is mounted to an end of the piston rod, the piston rod including an inner passageway in fluid communication with the first working chamber and including an opening at one end in fluid communication with the second pneumatic actuator, the valve holder including internal passageways providing fluid communication between the inner passageway of the piston rod and the second pneumatic actuator.

* * * * *